United States Patent [19]

Corbett

[11] 4,214,010
[45] Jul. 22, 1980

[54] REPLACEMENT OF WHOLE EGG IN BAKED CUSTARD

[75] Inventor: Constance R. Corbett, White Plains, N.Y.

[73] Assignee: Stauffer Chemical Company, Westport, Conn.

[21] Appl. No.: 973,507

[22] Filed: Dec. 26, 1978

[51] Int. Cl.² .................................................. A23J 3/02
[52] U.S. Cl. ................................... 426/573; 426/583; 426/656; 426/657
[58] Field of Search ............... 426/572, 573, 583, 656, 426/657, 614

[56] References Cited

U.S. PATENT DOCUMENTS

| | | | |
|---|---|---|---|
| 2,695,235 | 11/1954 | de Gaede | 426/583 |
| 2,699,995 | 1/1955 | Hull | 426/583 |
| 3,689,288 | 9/1972 | Duren | 426/656 |
| 3,806,608 | 4/1974 | Perret | 426/614 |
| 3,864,500 | 2/1975 | Lynn | 426/614 |
| 3,987,212 | 10/1976 | Seeley et al. | 426/614 |
| 4,046,922 | 9/1977 | Burkwall, Jr. | 426/656 |
| 4,072,764 | 2/1978 | Chess | 426/614 |
| 4,089,987 | 5/1978 | Chang | 426/583 |
| 4,103,038 | 7/1978 | Roberts | 426/657 |
| 4,120,986 | 10/1978 | Lynn | 426/614 |

*Primary Examiner*—Jeanette M. Hunter
*Attorney, Agent, or Firm*—Paul J. Juettner

[57] ABSTRACT

Up to 75% of the whole egg requirement of a custard can be replaced using from about 40% to about 60% of a whey protein concentrate containing from about 0.5% to about 5% carboxymethylcellulose and from about 60% to about 40% of a lactylated shortening. Substantially no change is seen in the food product containing the substitution. An economic advantage can be gained by the substitution.

17 Claims, No Drawings

REPLACEMENT OF WHOLE EGG IN BAKED CUSTARD

DESCRIPTION OF THE PRESENT INVENTION

The present invention is related to a whey protein concentrate composition useful as a partial replacement for the whole egg requirement in a custard.

BACKGROUND OF THE PRESENT INVENTION

Whey protein concentrates are well known materials in the prior art. These materials have been prepared by various means which effectuate the removal of the valuable whey protein from the millions of gallons of whey produced in this and other countries of the world per year. As more and more companies attempt to isolate this protein, more and more uses for the product have to be found. This is particularly important since the less expensive dry whey and delactosed whey can compete in various market areas that were originally held by the isolated whey protein materials.

The use of a whey protein concentrate as a replacement for non-faty dry milk in baked goods is set forth in U.S. Pat. No. 3,941,895. The prior art has not been able to put this invention into commercial practice since the cost of the whey protein concentrate far exceeds the cost of the non-faty dry milk constituent being placed. The only advantage that can be gained by using such a direct substitution would be in the preparation of baked goods having a high protein content.

It is known to provide an egg albumen whole egg partial replacer for bakery goods which comprises a whey protein concentrate and from about 0.5% to about 5% carboxymethylcellulose (CMC) (Chang, Ser. No. 868,598, filed Jan. 11, 1978). However, this product is not effective in partially replacing (up to 50%) the whole egg solids in baked custard. While the texture of the custard is not affected, the custard does not brown properly. The appearance of the custard has a marked affect on the desirability of the product.

In attempting to overcome the problem various fats and oils were added to the blend. Butter while providing some browning is disadvantageous as it leaves the surface of the baked custard oily.

Hydrogenated shortening did not disperse and left a layered effect. Margarine left an oily surface on the baked custard.

These problems can now be overcome in accordance with the present invention.

SUMMARY OF THE INVENTION

It has now been found that up to about 75% of the whole egg requirement of whole egg containing baked custard can be replaced with a composition comprising:

(a) from about 40% to about 60% of the composition of a blend of a whey solids product and from about 0.5% to about 5.0% based on the weight of the blend of carboxymethylcellulose, said whey solids product comprising:

(1) from about 75% to 100% of a substantially non-heat denatured whey protein concentrate having at least 35% protein wherein at least 50% of said protein is prepared from acid whey, and (2) from about 25% to 0% of another protein containing whey based product; and (b) from about 60% to about 40% of the composition of a lactylated shortening.

said composition replacing at least 90% of the whole egg solids replaced on a weight/weight basis, all percentages herein being on a dry weight basis.

The use of the composition of the present invention effectively replaces whole egg in baked custard providing good browning and taste characteristics while at a definite cost advantage based on current market prices. Since at least one manufacturer of custard pies uses approximately 200 million pounds of egg solids annually, a significant cost saving can be realized.

As used herein, all percentages are on a dry weight basis unless otherwise noted.

DETAILED DESCRIPTION OF THE PRESENT INVENTION

The whey protein concentrate used in the present invention is derived from acid whey which is the by-product obtained from the acid coagulation of milk protein by the use of lactic acid producing bacteria (e.g., lactobacillus sp.) or by the addition of food grade acids such as lactic or hydrochloric acid, i.e., direct acidification. In either case, acidification is allowed to proceed until a pH of approximately 4.6 is reached. At this pH, casein becomes insolubilized and coagulates as cheese curd. The cheese commonly produced by this method is cottage cheese. The whey obtained in this manner is commonly called acid or cottage cheese whey.

The whey protein concentrate as used in the present invention is most preferably derived from 100% acid cheese whey though minor amounts of other cheese wheys of less than 50% and preferably less than 20% can be utilized. Such other cheese wheys include but are not limited to cheddar cheese whey which is produced by the rennet coagulation of protein and is commonly called sweet whey. It is most preferred that the whey source be at least 90% acid whey.

The whey protein concentrate used in the present invention can be prepared by any one of a number of known processes including electrodialysis (Stribley, R. C., Food Processing, Volume 24, No. 1, page 49, 1963), reverse osmosis, (Marshall, P. G. et al., Fractionation and Concentration of Whey by Reverse Osmosis, Food Technology, 22(a), 696, 1968), gel filtration (U.S. Pat. No. Re. 27,806); or by ultrafiltration (Horton, B. S. et al., Food Technology, Volume 26, page 30, 1972). Chemical methods including the phosphate precipitation of whey protein can also be used as described in Gordon U.S. Pat. No. 2,388,624 and Melachouris U.S. Pat. No. 4,043,990. The disclosures of the foregoing articles and patents are incorporated herein by reference. The whey protein concentrate should contain at least 35% protein based on total Kjeldahl nitrogen.

It has been found that the most effective results are obtained using an ultrafiltered acid (cottage cheese) whey concentrate containing from about 40% to about 60% and preferably about 45% to about 55% whey protein. In a typical process, cottage cheese whey is neutralized to a pH of about 6.4 with 50% caustic. After storage, the pH is then adjusted to about 7.2 and any solids or precipitates are removed by centrifugal clarifiers. The clarified liquor is then pasteurized. The liquor is then fed into an ultrafiltration membrane unit. The retentate is condensed and spray dried. Protein products of 35% or more whey protein can be prepared by this process. Products generally comprising from about 40% to 60% protein (TKN×6.38), 10–30% lactose, 3–15% ash, and 0.1–4% fat are obtained. The dried retentate with the aforegiven composition is considered a whey protein concentrate. While it is preferred to use the whey protein concentrate in the dry form, the liquid form can also be used on a percent by weight solids basis to replace liquid whole eggs. Liquid levels in the final formulation are adjusted to the correct solid/liquid ratio. Liquid whey protein concentrate must be kept under refrigeration to prevent spoilage.

The whey protein concentrate must be substantially non-heat denatured. By non-heat denatured is meant that at least 40% of the protein in the concentrate as determined by solubility at pH 4.6 has not been denatured by the heating which is utilized in the preparation such as in pasteurization and drying. Thus, freeze-drying would denature less protein than spray drying. Other forms of denaturation do not effect the end properties of the whey protein such as using a sulfite. The use of a food grade sulfite such as sodium sulfite, sodium bisulfite, cysteine, cystine and the like in an amount of from about 0.1% to about 0.5% is particularly advantageous in reducing the coagulation temperature of the whey protein from about 80° C. to about 70° C. This more nearly approximates the coagulation temperature of egg.

The modified whey solids can also include from about 25% to 0% of another protein containing whey based product such as dried whey, delactosed whey, delactosed/demineralized whey where deminerilization is accomplished by any known method such as electrodialysis, ion exchange or material transfer (ultrafiltration, reverse osmosis), the dried permeate and dried delactosed permeate resulting from the ultrafiltration of whey, the precipitate prepared by neutralizing acid whey as is disclosed in U.S. Pat. No. 4,036,999 and the precipitate prepared by adding calcium ion to sweet whey followed by neutralization as disclosed in U.S. Pat. No. 3,560,219 as well as the dried mother liquor remaining after separation of these precipitates. Of these materials, the precipitates prepared in accordance with U.S. Pat. Nos. 3,560,219 and 4,036,999 are preferred. The disclosures of which are incorporated herein by reference. Most preferably the modified whey solids comprises 100% whey protein concentrate.

Carboxymethylcellulose of CMC is a water-soluble cellulose ether generally available as the sodium salt. CMC is known to have molecular weights which range from about 21,000 to 500,000. CMC is commercially available in viscosities ranging from about 3000 cps in 1% solution to 25 cps in 2% solution and even lower viscosities. It is preferred that the CMC used in the present invention provides a viscosity within the range of from about 1000 cps to about 10,000 cps in a 1% solution at about 25° C.

The carboxymethylcellulose is used in an amount ranging from about 0.5% to about 5% and preferably from about 1-3% based on the weight of the whey solids product. Slight adjustments may be required depending on the area of use but these adjustments are well within the skill of the art.

The whole egg replacer composition for use in the present invention also includes from about 40% to about 60% by weight of a lactylated shortening. As used herein, the term "shortening" is intended to include those substances which are solid at room temperature. Shortening is intended to include those materials which are naturally solid at room temperature as well as hydrogenated and plastic shortenings. The shortening contains from about 5% to about 20% glyceryl lacto esters (lactylated mono and diglycerides). Preferably, the shortening contains from about 5% to about 20% of glycerol lacto esters of fatty acids. These are well known compositions formed by esterifying glycerol with lactic acid and fatty acids.

The shortening can contain small quantities (from about 5% to about 10%) of other emulsifiers such as those listed in Bailey's Industrial Oil and Fat Products, (1964), Section 4.6, page 308. It is preferred that the shortening contain from about 5 to about 10% mono and diglycerides.

The shortening preferably contains a small quantity of lecithen in an amount up to 5%.

The preferred shortening is a partially hydrogenated vegetable oil with mono/diglycerides, glyceryl lacto esters of fatty acids and lecithin added. A product of this type is distributed by Durkee Food Service Group of SMC Corporation under the tradename D-21.

The albumen replacer of the present invention can be used as is or combined with other ingredients to effect various end uses. A whole egg replacer can be prepared by blending the albumen replacer with egg yolk and/or an egg yolk replacer such as that described in U.S. patent application Ser. No. 677,354, now U.S. Pat. No. 4,072,064. In that patent application the contents of which are hereby incorporated by reference, an egg yolk extender is provided which is the combination of full fat soy flour, lecithin, wheat flour and optionally emulsifiers, humectants, and coloring agents. In a system requiring egg yolk, up to 75% of the yolk can be effectively replaced. For example, in a formulation requiring whole egg, 50% of the yolk requirement and 50% of the egg albumen can be replaced. An additional egg yolk replacer is disclosed in the copending application of Chess, Ser. No. 857,053 filed Dec. 5, 1977, wherein the previously discussed egg yolk replacer is prepared with defatted soy flour and oil in place of full fat soy flour. The contents of the latter application are hereby incorporated by reference. It has been found that the composition of the invention can be used to extend whole eggs up to 50% replacement. It is not required to compensate for the yolk replaced.

The albumen replacer can be blended with milk replacers and if desired, yolk or yolk replacers to prepare albumen/NFDM or whole egg/NFDM replacers, respectively. By milk replacers is meant any material formulated to replace milk. These include whey protein concentrate, whey products and soy/whey products.

As used herein, the protein amount is based on total Kjeldahl nitrogen.

The invention is further illustrated in the examples which follow.

EXAMPLES 1–3

Baked Custard Pie

A baked custard pie was prepared by mixing in the usual manner the ingredient listed in Table I below.

TABLE I

| BAKED CUSTARD PIE FORMULATION | | | |
|---|---|---|---|
| | Control % | Whole Fresh Egg Solids Replacer, % | |
| Ingredients | Example 1 | Example 2 | Example 3 |
| Whey Protein Concentrate and CMC-7HF[1] | — | 1.9 | — |
| Whole Milk Solids | 4.9 | 4.9 | 4.9 |
| Whey Protein | | | |

TABLE I-continued

| | BAKED CUSTARD PIE FORMULATION | | |
|---|---|---|---|
| | Control % | Whole Fresh Egg Solids Replacer, % | |
| Ingredients | Example 1 | Example 2 | Example 3 |
| Concentrate Emulsified Shortening and CMC[2] | — | — | 1.9 |
| Whole Fresh Egg Solids | 3.8 | 1.9 | 1.9 |
| NFDM, low heat | 4.9 | 4.9 | 4.9 |
| Sugar | 7.7 | 7.7 | 7.7 |
| Salt | 0.2 | 0.2 | 0.2 |
| Instant Starch[3] | 0.9 | 0.9 | 0.9 |
| Vanilla flavoring, liquid | 0.8 | 0.8 | 0.8 |
| Water | 76.8 | 76.8 | 76.8 |
| | 100.0 | 100.0 | 100.0 |

[1] 98% whey protein concentrate (50% whey protein) 2% CMC-7HF, from Hercules
[2] 52% whey protein concentrate (50% whey protein) 46% emulsified shortening, D-21 from Durkee 2% carboxymethylcellulose (CMC-7HE)
[3] Clearjel, National Starch The custards were placed in ordinary 9" pie shells and baked in a 218° C. oven for 30–35 minutes. The pies prepared from the control (Example 1) were brown and had the acceptable appearance of a custard pie. The pie made from Example 2 was white and had an unacceptable appearance. The pie prepared in accordance with the present invention (Example 3) had a brown and an acceptable appearance closely approximating that of the control.

The custard pies were judged by an 18 member untrained taste test panel for organoleptic qualities using the hedonic scale set forth in Table II. The results are an average of 18 scores. The results are reported in Table III.

TABLE II

| RATING SCALES | |
|---|---|
| FLAVOR ACCEPTABILITY AND TEXTURE ACCEPTABILITY | |
| NUMERICAL | VERBAL |
| 7.0 | Like extremely |
| 6.0 | Like very much |
| 5.0 | Like |
| 4.0 | Neither like nor dislike |
| 3.0 | Dislike |
| 2.0 | Dislike very much |
| 1.0 | Dislike extremely |
| FLAVOR SIMILARITY | |
| NUMERICAL | VERBAL |
| 6.0 | Extremely similar |
| 5.0 | Very similar |
| 4.0 | Similar |
| 3.0 | Slightly dissimilar |
| 2.0 | Very dissimilar |
| 1.0 | Extremely dissimilar |

TABLE III

TASTE PANEL RESULTS
WHOLE FRESH EGG SOLIDS REPLACER
WHEY PROTEIN CONCENTRATE/CMC
(Ex. 2) vs. CONTROL (Ex. 1)

| | Example 2 | Control (Ex. 1) |
|---|---|---|
| Preference | 10 | 2 |
| No Preference | 4 | |
| Flavor Acceptability | 5.2 | 4.8 |
| Texture Acceptability | 5.0 | 4.7 |
| Flavor Similarity | | 4.1 |

WHEY PROTEIN CONCENTRATE/
EMULSIFIED SHORTENING/CMC
(Ex. 3) vs. CONTROL (Ex. 1)

TABLE III-continued

| | Example 3 | Control (Ex. 1) |
|---|---|---|
| Preference | 5 | 6 |
| No Preference | 4 | |
| Flavor Acceptability | 5.2 | 5.1 |
| Texture Acceptability | 4.2 | 4.4 |
| Flavor Similarity | | 3.4 |

The viscosity and syneresis of the custard products prepared in accordance with the present invention were compared to the whole egg control of Example 1.

The syneresis was measured as follows:
1. 125 g of the liquid custard filling was weighed into a tared margarine-coated 250 ml glass beaker.
2. The custard-filler beaker was placed in a pan of water and baked at 218° C. for 18–20 minutes.
3. The baked custard was allowed to cool; the beaker was covered with aluminum foil and refrigerated (6° C.) overnight.
4. Flexible wire mesh was taped over the mouth of an 11.5 cm diameter plastic funnel and the funnel was placed in a 50 ml graduate cylinder.
5. The custard was removed from the beaker, maintaining the sample in one piece, and weighed.
6. The custard was then placed on top of the funnel (in one piece) and allowed to stand 2 hours, after which the liquid level in the graduate cylinder was read.

The results for viscosity and syneresis are reported in Table IV below.

TABLE IV

VISCOSITY AND SYNERESIS
WHOLE FRESH EGG SOLIDS REPLACER

| | VISCOSITY | | | | |
|---|---|---|---|---|---|
| Sample | Sample Temp., °F. | Viscometer | Spindle | Speed rpm | Viscosity (cps) |
| Ex. 3 | 42.8 | RVT | T-C | 5 | 90,000 |
| Control | 42.8 | RVT | T-C | 5 | 86,000 |

| | SYNERESIS | |
|---|---|---|
| Sample | Initial wt., g. | Syneresis, ml. After 2 Hours |
| Ex. 3 | 119.0 | 4 |
| Control | 115.0 | 5 |

For comparative purposes, a baked custard pie was prepared at 50% reduced egg using the formulation listed in Table V below and compared to a control of the same formulation as Example 1. After baking, the pie with 50% reduced egg did not brown to an acceptable degree but the control did brown acceptably. The taste test panel evaluations are reported in Table VI.

TABLE V

BAKED CUSTARD PIE FORMULATION
50% REDUCED EGG

| INGREDIENTS | CONTROL, % | 50% REDUCED EGG |
|---|---|---|
| Whole milk solids | 4.9 | 5.3 |
| Whole fresh egg solids | 3.8 | 2.1 |
| NFDM, low heat | 4.9 | 5.3 |
| Sugar | 7.7 | 8.4 |
| Salt | 0.2 | 0.2 |
| Instant starch[1] | 0.9 | 1.0 |
| Vanilla flavoring, liquid | 0.8 | 0.9 |
| Water | 76.8 | 76.8 |
| | 100.0 | 100.0 |

[1] Clearjel, National Starch

TABLE VI

TASTE PANEL RESULTS
NO REPLACEMENT SYSTEM
50% EGG vs. CONTROL

|  | 50% EGG | CONTROL |
|---|---|---|
| Preference | 5 | 5 |
| No Preference | 0 | |
| Flavor Acceptability | 5.1 | 4.8 |
| Texture Acceptability | 4.7 | 4.8 |
| Flavor Similarity | 3.2 | |

What is claimed is:

1. A method for preparing whole egg containing baked custard which comprises replacing up to about 75% of the whole egg requirement of said custard with an egg replacer composition comprising:
   (a) from about 40% to about 60% of the composition of a blend of a whey solids product and from about 0.5% to about 5.0% based on the weight of the blend of carboxymethylcellulose, said whey solids product comprising:
      (1) from about 75% to 100% of a substantially non-heat denatured whey protein concentrate having at least 35% protein wherein at least 50% of said protein is derived from acid whey, and
      (2) from about 25% to 0% of another protein containing whey based product; and
   (b) from about 60% to about 40% of the egg replacer composition of a lactylated shortening, said egg replacer composition replacing at least 90% of the whole egg solids replaced on a weight/weight basis, all percentages herein being on a dry weight basis.

2. The method as recited in claim 1 wherein at least 90% of said protein is derived from acid whey.

3. The method as recited in claim 1 wherein said whey protein concentrate is derived by the ultrafiltration of acid whey.

4. The method as recited in claim 1 wherein said whey solids product consists of whey protein concentrate.

5. The method as recited in claim 1 wherein said carboxymethylcellulose has a viscosity within the range of from about 1000 to about 10,000 cps in a 1% solution at 25° C.

6. The method as recited in claim 1 wherein said blend contains from about 1% to about 3% carboxymethylcellulose.

7. The method as recited in claim 1 wherein said lactylated shortening is a partially hydrogenated vegetable oil with lactylated mono/diglycerides added.

8. The method as recited in claim 1 wherein said lactylated shortening is a partially hydrogenated vegetable oil with mono/diglycerides, lactoesters of fatty acids and lecithin added.

9. A composition for replacing up to about 75% of the whole egg requirement of a whole egg baked custard which comprises:
   (a) from about 40% to about 60% of the egg replacer composition of a blend of a whey solids product and from about 0.5% to about 5.0% based on the weight of the blend of carboxymethylcellulose, said whey solids product comprising:
      (1) from about 75% to 100% of a substantially non-heat denatured whey protein concentrate having at least 35% protein wherein at least 50% of said protein is derived from acid whey; and
   (b) from about 60% to about 40% of the egg replacer composition of a lactylated shortening, said egg replacer composition replacing at least 90% of the whole egg solids replaced on a weight/weight basis, all percentages herein being on a dry weight basis.

10. The composition as recited in claim 9 wherein at least 90% of said protein is derived from acid whey.

11. The composition as recited in claim 9 wherein said whey protein concentrate is derived by the ultrafiltration of acid whey.

12. The composition as recited in claim 9 wherein said whey solids product consists of whey protein concentrate.

13. The composition as recited in claim 9 wherein said carboxymethyl cellulose has a viscosity within the range of from about 1000 cps to about 10,000 cps in a 1% solution at 25° C.

14. The composition as recited in claim 9 wherein said blend contains from about 1% to about 3% carboxymethyl cellulose.

15. The composition as recited in claim 9 wherein said lactylated shortening is a partially hydrogenated vegetable with lactylated mono/diglycerides added.

16. The composition as recited in claim 9 wherein said lactylated shortening is a partially hydrogenated vegetable oil with mono/diglycerides, lactoesters of fatty acids and lecithin added.

17. The baked egg custard as prepared in accordance with the method of claim 1.

* * * * *